May 22, 1956 J. R. OISHEI 2,746,652
WINDSHIELD WASHER
Filed Dec. 3, 1952 2 Sheets-Sheet 1

INVENTOR.
JOHN R. OISHEI
BY
Bean, Brooks, Buckley & Bean.
ATTORNEYS.

May 22, 1956
J. R. OISHEI
2,746,652
WINDSHIELD WASHER
Filed Dec. 3, 1952
2 Sheets-Sheet 2
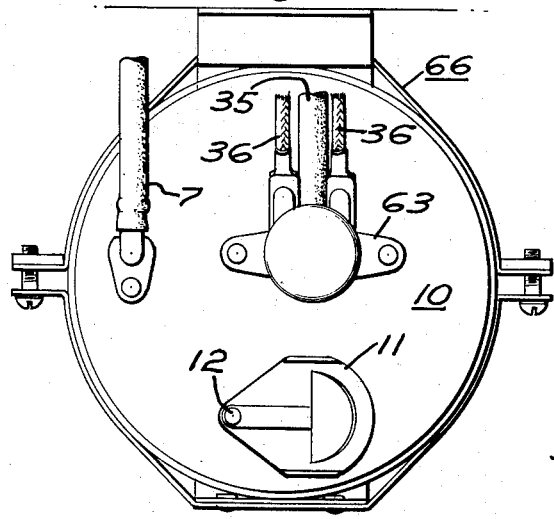
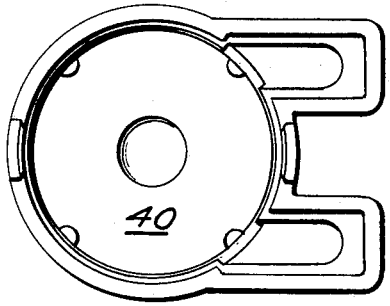
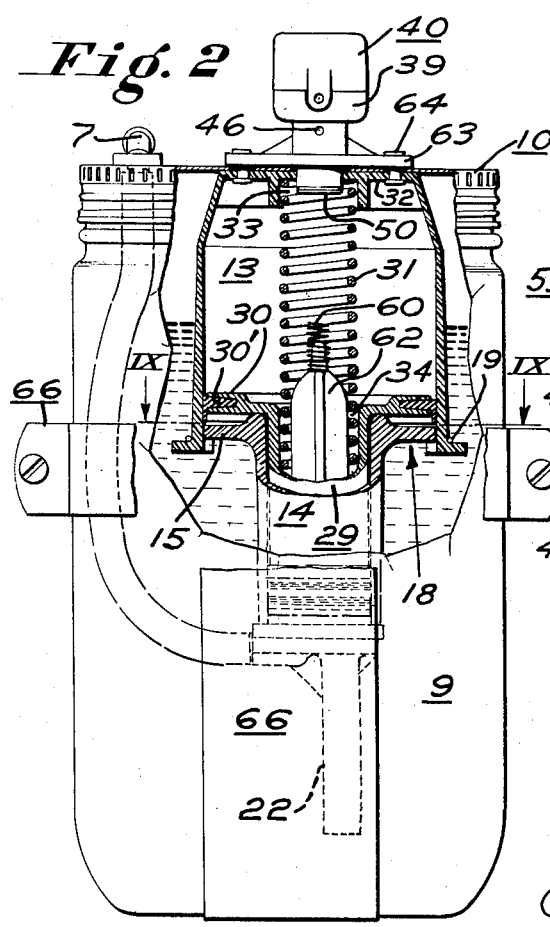
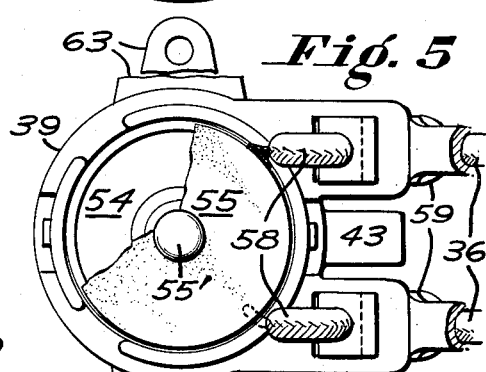
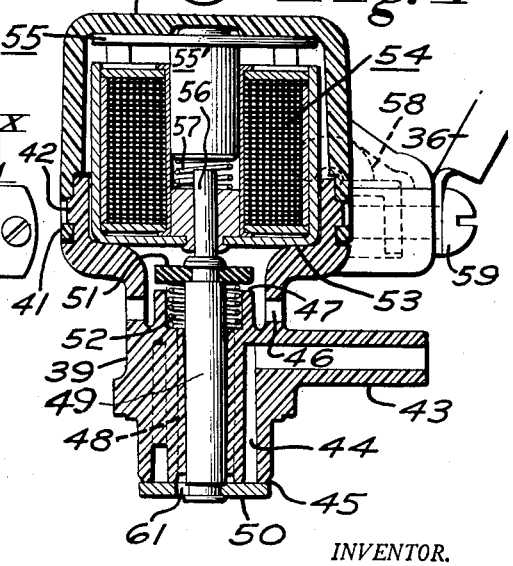
INVENTOR.
JOHN R. OISHEI
BY
Beau, Brooks, Buckley & Beau,
ATTORNEYS.

United States Patent Office 2,746,652
Patented May 22, 1956

2,746,652

WINDSHIELD WASHER

John R. Oishei, Buffalo, N. Y., assignor to Trico Products Corporation, Buffalo, N. Y.

Application December 3, 1952, Serial No. 323,902

11 Claims. (Cl. 222—385)

This invention relates to windshield washers which are designed to maintain clear vision ahead during vehicular travel. Such washers have found a favorable reception in the industry and by the motorist, in that it enables the motorist to wash his windshield quickly of road-splash, as he drives along, by simply opening a valve accessible from within the vehicle. The installation, however, has necessitated the extension of the air or suction line up to the instrument panel under conditions already congested.

The object of this invention is to simplify the installation of a windshield washer and to insure a faster response of the same to the demand of the motorist by utilizing an electric control for the heretofore proven fluid motor-pump unit of the washer. In such unit, a suction line is opened to the pump motor to start the pump in operation for a predetermined time interval. The present invention contemplates a practical construction by which the washer is set in operation electrically and with a minimum current consumption.

A further object of the invention is to improve the motor-pump unit in design and fabrication to economize in its manufacture and to provide a durable construction capable of withstanding extreme weather conditions without losing its efficiency.

The foregoing and other objects will manifest themselves as this description progresses, reference being made therein to the accompany drawings wherein Fig. 1 is a schematic view of the present washer system installed on a motor vehicle;

Fig. 2 is a side view of the pump and reservoir assemblage with portions in section for clarity in showing the motor for the pump;

Fig. 3 is a top plan view of such assemblage;

Fig. 4 is a view in vertical section of the electromagnetic valve;

Fig. 5 is a top plan view of the same after removal of its cover;

Fig. 6 is a bottom plan view of the cover;

Figure 1:
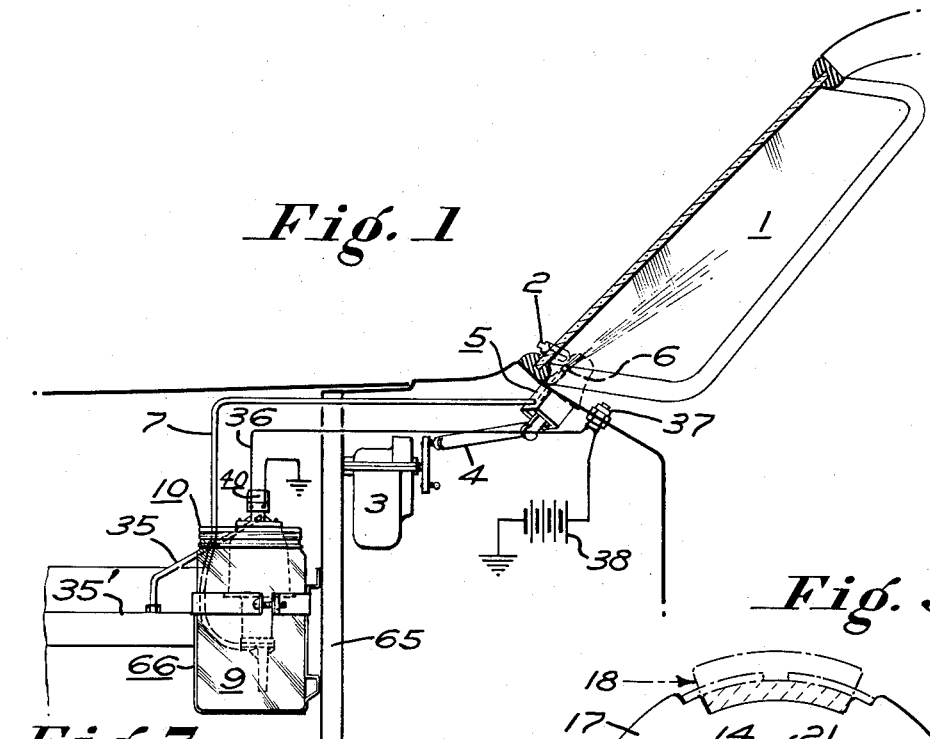
Figure 7:
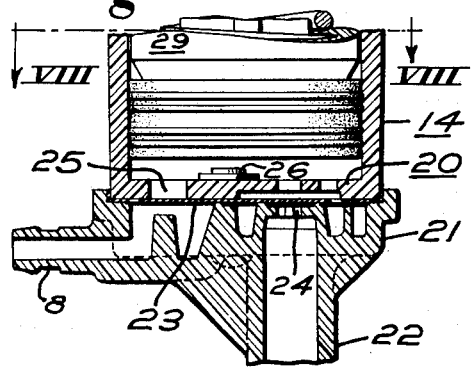
Fig. 7 is a fragmentary vertical sectional view of the pump.
Figure 9:
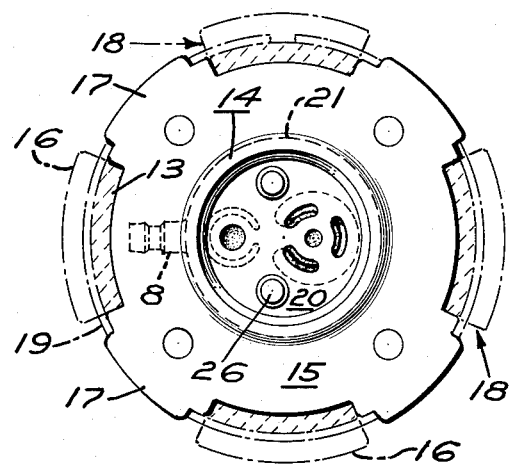
Fig. 9 is a top plan view of the pump cylinder as viewed about on line 9—9 of Fig. 2 with the piston removed.
Figure 8:
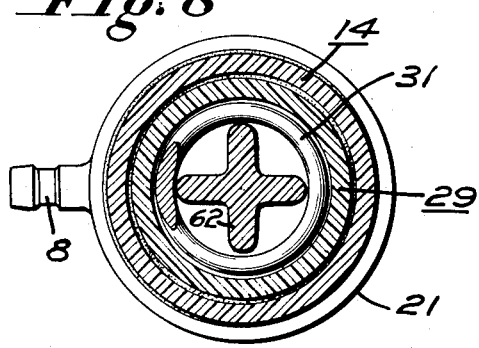
Fig. 8 is a horizontal sectional view thereof taken about on line 8—8 of Fig. 7.
Figure 10:
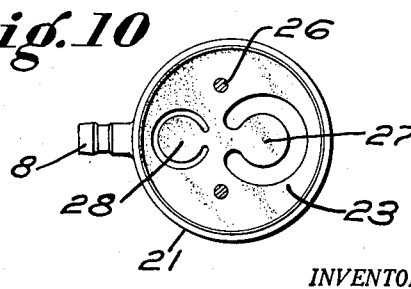
Fig. 10 is a plan view looking into the cap section for the bottom of the cylinder.

Referring more particularly to the drawings, the numeral 1 designates the windshield of a motor vehicle which is equipped with one or more wipers 2 oscillatable across the field of vision by a motor 3 and a connecting transmission 4. Each wiper is carried by a rock shaft that is journaled in a cowl-mounted housing 5 which may also serve as a support for a spray nozzle 6, in a well known manner. A conduit 7 connects the nozzle 6 to the discharge nipple 8 of the washer unit now to be described.

The washer unit of the present invention has a reservoir 9 with a screw top cover 10 having a filling opening and a closure 11 therefor pivoted at 12. Suspended from the cover to hang into the reservoir, is a motor-powered pump the parts of which are largely designed for being molded, as in plastic, and to this end it comprises an inverted cup-shaped shell serving as a motor chamber 13 and a pump chamber 14, the latter having a peripheral flange 15 fitting within the open bottom of the motor chamber to close the same. The two parts 13 and 15 have interfitting radial lugs 16 and 17, respectively, the lugs 17 on the flange 15 engaging in the notched-out seats 18 between the lugs 16 on the motor chamber 13 where they are held by a split retaining ring 19. This arrangement facilitates the uniting of the two chambers and permits a ready detachment for inspecting and servicing the unit. The bottom end wall 20 of the pump chamber has a removable cap 21 provided with an inlet tube 22 and the outlet nipple 8 to which latter the conduit 7 is connected. A valving disk 23 is interposed between the end wall 20 and its cap 21 to seat over the inlet port 24 in the latter and over the outlet port 25 in the wall 20. This dual functioning disk 23 is clamped in position, as by fasteners 26, and is formed with valving flaps 27 and 28 for the respective ports 24 and 25. The pump plunger 29 is preferably molded as an integral unit with a relatively larger motor piston 30, carrying a packing member 30', and a coiled spring 31 is interposed between the piston-plunger unit 29, 30 and the top wall 32 of the motor chamber 13 for imparting the delivery stroke to the pump. To support the spring in position, the top wall and the differential piston-plunger unit are formed with axially alined recesses 33 and 34, respectively.

The motor, if of the fluid type, is connected by a conduit 35 to a source of operating pressure, such as the intake manifold 35', through a control valve which is herein depicted as an electromagnetic one arranged in an electric circuit 36 with an actuating switch 37 and a source of energy 38. The electromagnetic valve has a two-part housing consisting of a base section 39 and a cover section 40 detachably joined together by apertured detent ears 41 on one being sprung over shoulders 42 on the other section. The base section is provided with a suction nipple 43 opening into an annular passage 44 and therethrough to a valve seat 45. It is also provided with one or more atmospheric ports 46 communicating through a second valve seat 47 and an axial passage 48 into the motor chamber 13. A stem 49 is slidable axially in the base section and through the concentric valve seats 45 and 47 to carry the cooperating suction valve 50 and an atmospheric valve 51, respectively. The length of the stem is sufficient to unseat one valve as the companion valve seats, a light coiled spring 52 acting normally to hold the valve 50 engaged with its seat 45. The upper side of the base or valve section is enlarged to provide a ledge 53 for supporting an electromagnet 54 with its armature plate 55 and core 55' in axial alinement with the double valve member 49, 50, 51. The magnet is connected in the circuit 36, and interposed between the armature and the valve member is a slidable hammer pin 56 having sufficient play or clearance so that when struck by the armature, it will impart a hammer blow to the valve member to break the suction hold and shift it axially for closing off the atmosphere and opening up the suction communication. A spring 57 normally lifts the armature unit 55, 55' off the magnet when the circuit is opened to insure this forceful jarring impact upon the valve when the switch 37 is next closed. With this construction it is possible to use a smaller magnet and thereby conserve the electric energy. The terminals 58 of the magnet coil are extended out through binding posts 59 through which the circuit connections to the switch are established.

For operating the washer unit, it is only necessary to close the electric circuit 36 by momentarily depressing the button of switch 37 and then releasing it. Instantaneous with the closing of the circuit, the electromagnet becomes energized and attracts its armature to open the valve 50 and to close the valve 51. This spacing enables the armature to gain momentum sufficient to break the hold of the pressure differential on the valve 50 and to unseat the latter while closing the atmospheric valve 51. It is therefore possible to use a smaller magnet and thereby conserve the electric energy. With the suction valve 50 open, the motor chamber will be evacuated above the piston-plunger unit, the lower portion of the chamber being open to the atmospheric through the interfitting parts 16, 17. The developed pressure differential will lift the unit to intake liquid from the reservoir into the pump chamber, and as the plunger unit 29, 30 ascends it will carry a valve-tripping spring 60 up against the opened valve 50 and compress it to overcome the pressure differential force that has been holding the atmospheric valve 51 closed. The thus opened valve 51 will admit the outside atmosphere to the motor chamber while the suction valve 50 closes off the suction line. With the motor chamber vented to the atmosphere, the piston-plunger unit will descend under the urge of the spring 31 to discharge the liquid solvent out through the nozzle 6 and onto the windshield. During such ejecting stroke of the pump, the atmospheric air will enter the motor chamber through a bleed opening 61 in the seated suction valve 50 to enable unhindered functioning of the spring 31.

The valve tripping spring 60 may be carried by a support 62 that is arranged within the lower end of the motor spring 31 and within the recess 34. The valve housing 39, 40 may have a base flange 63 seating upon the reservoir cover 10 and secured thereto, by rivets 64, which latter also are passed through the top wall 32 to anchor the motor chamber in place. The cover and the top wall 32 will have registering openings through which the valve 50 and its seat 45 may depend into the motor chamber. The reservoir may be suitably supported on the fire wall 65 by a bracket 66.

The windshield washer is quickly responsive to the touch of the switch button. It is economical in operation and efficient as well as effective in use with a minimum distraction from the safe operation of the vehicle. The parts are easily molded from plastic and readily assembled, the motor chamber 13 and the pump chamber 14 being held together by the split ring 19.

In lieu of the fluid motor 13, 30, an electric motor may be used to actuate the pump plunger, for example in a manner illustrated in an earlier Patent No. 2,649,332, in which event the electric power unit will be arranged within the shell chamber 13 and the trip spring 60 on the plunger unit will serve to operate an electric control switch.

The foregoing description has been given in detail for clearness and without thought of limitation since the inventive principles are capable of assuming other physical embodiments without departing from the spirit of the invention and the scope of the appended claims.

What is claimed is:

1. A windshield washer comprising a motor-pump unit having a motor chamber and a pump chamber with a differential piston-plunger member operating therein, a control therefor having a normally closed suction valve operable to set the motor in operation for actuating the pump on one stroke, means operable by the plunger member at the end of the stroke to render the valve inoperative, and means acting to impart a return stroke to the plunger member when the valve is inoperative, said control including an electromagnet having an armature with a play connection to the valve to enable striking the latter a jarring impact to break the suction for opening the valve.

2. A windshield washer comprising a motor-pump unit having a motor chamber and a pump chamber with a differential piston-plunger member operating therein, a control therefor having a normally closed suction valve operable to set the motor in operation for actuating the pump on one stroke, means operable by the plunger member at the end of the stroke to render the valve inoperative, and means acting to impart a return stroke to the plunger member when the valve is inoperative, said control including an electromagnet having an armature with a play connection to the valve to enable striking the latter a jarring impact to break the suction for opening the valve, said valve normally engaging a seat and having a hammer pin interposed between the valve and the armature.

3. A windshield washer comprising a motor-pump unit having a motor chamber and a pump chamber with a differential piston-plunger member operating therein, a control therefor having a normally closed suction valve operable to set the motor in operation for actuating the pump on one stroke, means operable by the plunger member at the end of the stroke to render the valve inoperative, and means acting to impart a return stroke to the plunger member when the valve is inoperative, said control including an electromagnet having an armature with a play connection to the valve to enable striking the latter a jarring impact to break the suction for opening the valve, said valve normally engaging a seat, and said valve having an atmospheric bleed opening normally open therethrough when seated to vent the motor chamber for action by said return means.

4. A windshield washer comprising a motor-pump unit having a motor chamber and a pump chamber with a differential piston-plunger member operating therein, a control therefor having a normally closed suction valve operable to set the motor in operation for actuating the pump on one stroke, means operable by the plunger member at the end of the stroke to render the valve inoperative, and means acting to impart a return stroke to the plunger member when the valve is inoperative, said control including an electromagnet having an armature with a play connection to the valve to enable striking the latter a jarring impact to break the suction for opening the valve, said valve normally engaging a seat and having a stem in axial alinement with the path of the armature, and an atmospheric valve carried by the stem for being unseated by the stem when the first valve is seated to vent the motor chamber for action by said return means.

5. A suction actuated windshield washer power unit comprising a plastic shell having a top wall and constituting a motor chamber, a control valve having a port opening into the chamber and a valving member held seated by suction to close the port, an electromagnet having an armature normally spaced from the valving member and movable thereagainst to break the suction hold and to unseat said member, a pump chamber opening into the lower end of the motor chamber, and a differential piston-plunger member operable in the two chambers.

6. A windshield washer comprising a reservoir having a removable cover, an inverted cup-shaped shell secured by its top wall to the underside of the cover and constituting a motor chamber, a valve unit having a base flange seating upon the cover and having a valved portion depending through registering openings in the cover and top wall of the chamber, a pump chamber having a peripheral flange at one end fitting within the open bottom of the shell and forming a closure therefor, means detachably securing the flange to the shell, a plastic unitary piston-plunger unit operable in the two chambers, and a coiled spring interposed between the unit and the cover and acting to urge the unit on one stroke.

7. In a windshield washer, a reservoir cover, an inverted cup-shaped shell having a top wall seating against the underside of the cover and constituting a motor chamber, a valve unit having a base flange seating upon the cover and having a valved portion depending through openings in the cover and wall into the chamber, a relatively smaller pump chamber having a peripheral flange at one end fitting into the open bottom of the shell, the rim of the open bottom and the flange having outstanding lugs alternatingly interlocked with one another, an annular member encircling the shell and engaged with the underside of the flange lugs and the upper side of the shell lugs, a differential piston-plunger unit operable in the two chambers, and spring means interposed between the unit and the cover to urge the former on one stroke.

8. In a windshield washer, a combined motor and pump assemblage having a plastic shell closed at its top and open at its bottom and constituting a motor chamber, a valve unit having a valve portion depending into the motor chamber for creating a predetermined pressure therein, a plastic pump chamber having a peripheral flange at one end forming a closure for the open bottom of the motor chamber, a piston-plunger unit operable in the two chambers and having an axial recess opening into the motor chamber, a coiled spring engaged at one end in the recess and having its opposite end engaged about the valve portion, and a trip member loose within the unit recess and located inside the coiled spring for actuating the valve portion to enable the spring to function.

9. In a windshield washer, an inverted cup-shaped shell having a top wall and an open bottom and constituting a motor chamber, a power control accessible from within the chamber, a cupped pump chamber having a peripheral flange at its open end forming a closure for the motor chamber, means detachably securing the flange to the shell, a motor-plunger unit operable in the two chambers, a coiled spring acting normally to urge the unit in one direction, the pump chamber having an end wall with a port therein, a cap placeable over the end wall and having an inlet passage and an outlet passage, and a valving disk means interposed between and secured in place by the end wall and the cap.

10. A windshield washer comprising a reservoir having a removable cover constituting a motor chamber open at its bottom, a control valve operable to open the chamber to a source of operating pressure, a pump chamber having inlet and outlet ports in its lower portion and interlockable with the open bottom of the motor chamber to close the latter, means securing the two chambers together, a unitary piston-plunger unit operable in the two chambers and formed with an axial recess opening into the motor chamber, and a coil spring having one end portion located within the recess and its opposite end compressed against the opposing wall of a motor chamber.

11. A windshield washer comprising a motor-pump unit having a motor chamber and a pump chamber with a dual fluid displacing member operating in the two chambers, a control therefor having a normally closed suction valve operable to set the motor in operation for actuating the pump on one stroke, means operable by the fluid displacing member at the end of the stroke to render the valve inoperative, and means acting to impart a return stroke to the fluid displacing member when the valve is inoperative, said control including an electromagnet having an armature with a play connection to the valve to enable striking the latter a jarring impact to break the suction for opening the valve.

References Cited in the file of this patent

UNITED STATES PATENTS

| | | |
|---|---|---|
| 1,390,617 | Jay | Sept. 13, 1921 |
| 1,825,411 | Murphy | Sept. 29, 1931 |
| 2,100,092 | Tear | Nov. 23, 1937 |
| 2,153,519 | Horton | Apr. 4, 1939 |
| 2,381,650 | Dick | Aug. 7, 1945 |
| 2,409,517 | Schmit | Oct. 15, 1946 |